United States Patent Office 3,321,970
Patented May 30, 1967

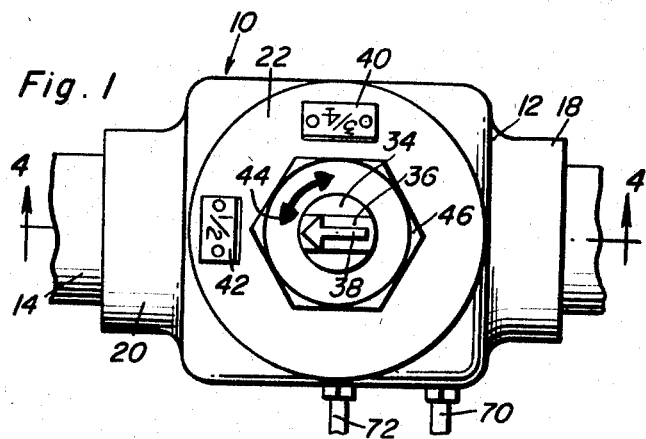
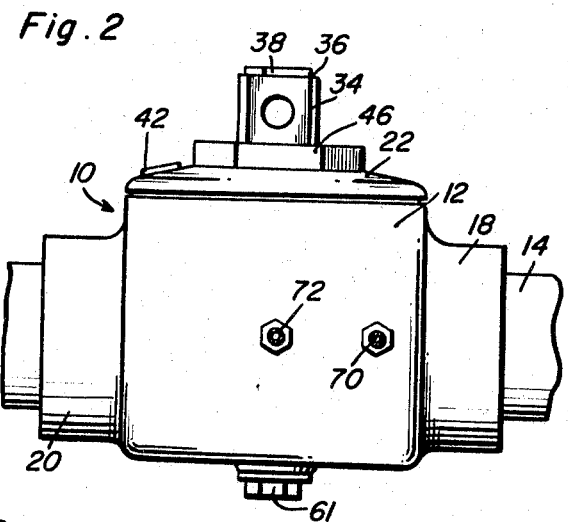
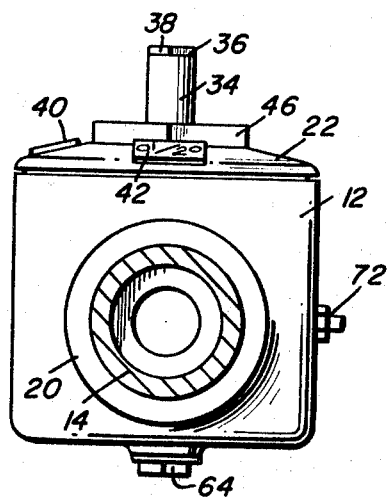
William E. Walker, Sr.
William E. Walker, Jr.
INVENTORS

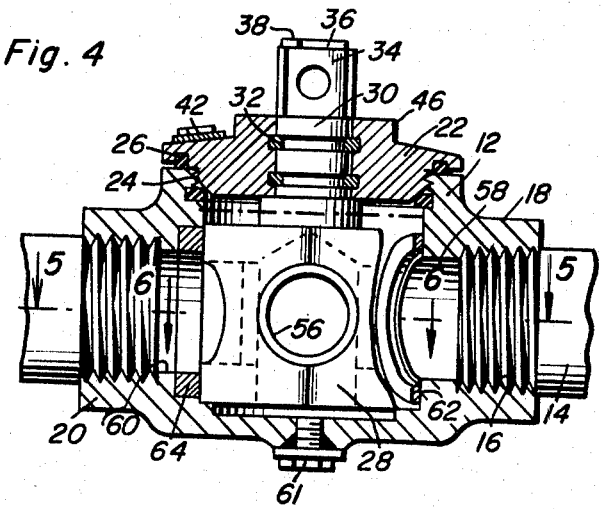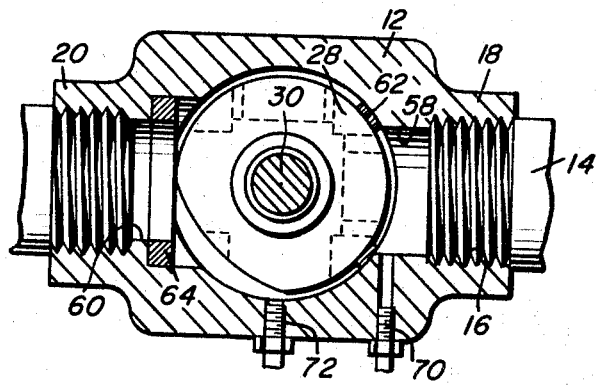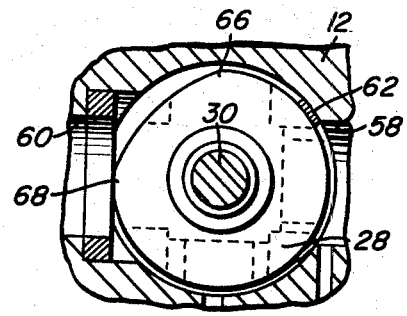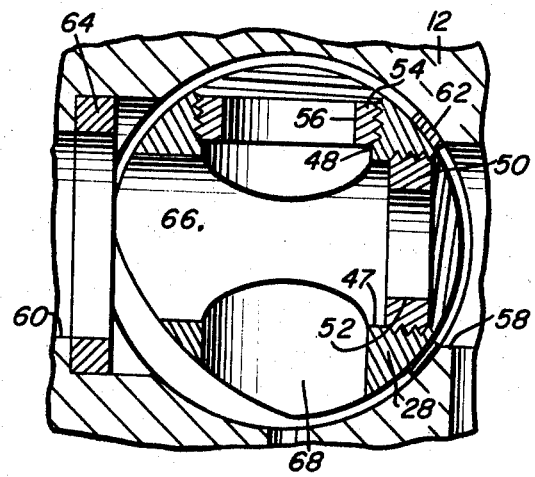

3,321,970
DUAL ORIFICE PLUG FITTING
William E. Walker, Sr., Artesia Wells, and William E. Walker, Jr., Freer, Tex., assignors to Charles Wheatley Company, Tulsa, Okla., a corporation of Oklahoma
Filed Oct. 15, 1964, Ser. No. 404,016
4 Claims. (Cl. 73—211)

The present invention generally relates to a device for measuring the flow rate of gases through pipes or conduits and more particularly relates to a dual orifice plug fitting for use in measuring the flow rate of natural gas.

In measuring large quantities of natural gas, it is usual to pass the gas through a constriction or orifice in a pipe or conduit and by measuring the difference in pressure between the two sides of the constriction, the flow rate can be determined by calculation or by consulting a graph or mathematical table provided for the particular construction size. Thus, by knowing the size of the orifice, the positive pressure and the differential pressure, a flow rate for a gas of known properties may be derived by mathematical calculations or directly determined by employing established mathematical tables. Usually, the constriction or orifice used for this purpose is in the form of a round hole in a plate of hard and relatively thin metal with the plate being clamped between flanges interposed in the pipe line or conduit through which the flow is being conducted. The plate being so placed between the flanges so that the orifice is substantially concentric with the pipe eliminates lateral flow of the gases so that a true differential pressure may be read on both sides of the orifice. However, in such structures, in order to change from one orifice to another, it usually requires that flow in the conduit be shut-off on each side of the flanges by means of valves or the like and then remove the bolt which holds the flanges together, remove one plate and substitute another plate therein having a different size orifice and then reconnect the flanges and open the valves which isolated the measuring device. This operation is rather slow and laborious and at times is somewhat dangerous. Further, the stoppage of flow is often highly detrimental to a particular operation in which continuous flow of gas is essential.

In view of the shortcomings of present procedures, one of the objects of the present invention is to provide a novel means whereby orifices of various size may be quickly, expeditiously and safely brought into position for use by simply rotating a plug having dual orifices orientated therein so that such orifices will be orientated concentric with the flow pipe or conduit.

A further object of the present invention is to provide a plug fitting which enables the orifices to be changed without shutting off the flow of gas to the fitting thus enabling a continuous supply of gas when this is necessary in a particular operation.

Yet another object of the present invention is to provide a plug fitting having a dual orifice therein orientated in such a manner so that the orifices may be changed under pressure without shutting off the flow of gas.

Still another object of the present invention is to provide a dual orifice fitting as set forth in the preceding objects including novel means for indicating which size orifice is in use.

Yet another important feature of the present invention is to provide a plug fitting having a novel and improved dual orifice plug incorporated therein that is relatively simple in construction and yet will provide a positive seal to prevent leakage around the plug by a novel cam assembly with the plug and orifices being so constructed as to never stop the flow of gas even when the plug is rotated thus rendering a plug fitting that is highly feasible from both a cost and operational standpoint.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the dual orifice plug fitting of the present invention;

FIGURE 2 is a side elevational view of the invention;

FIGURE 3 is an end view of the fitting;

FIGURE 4 is a longitudinal, sectional view taken substantially upon a plane passing along section line 4—4 of FIGURE 1 illustrating the structural components of the present invention and their cooperative relationship;

FIGURE 5 is a longitudinal, plan sectional view taken substantially upon a plane passing along section line 5—5 of FIGURE 4 illustrating further structural details of the invention illustrating the construction of the plug;

FIGURE 6 is an enlarged plan sectional view illustrating the construction of the plug including the cam surfaces thereon for sealing the plug in relation to the flow line; and FIGURE 7 is a sectional view similar to FIGURE 6 but illustrating the plug in elevation.

Referring now specifically to the drawings, the dual orifice plug fitting of the present invention is generally designated by the numeral 10 and includes a metallic casing or housing 12 interposed in a gas line or conduit 14 and being connected thereto by a suitable screwthreaded connection 16 with the ends of the housing 12 including longitudinally projecting bosses 18 and 20 which are internally threaded for receiving the pipe 14 in a conventional manner.

The housing 12 is provided with a removable cap or bonnet 22 having a screwthreaded connection 24 with an internally threaded hollow interior portion of the housing 12. A suitable sealing gasket 26 is provided for the cap or bonnet 22. A rotatable plug 28 is rotatably disposed within the interior of the casing 12 and includes a stem or shank 30 extending upwardly through the cap 22 and journalled and sealed therein by seal rings 32. The upper end of the stem is provided with a flattened extension 34 for receiving a tool such as a wrench or the like and the upper end of the flattened portion 36 is provided with a directional arrow 38 formed thereon. The directional area may be pointed toward name plates 40 and 42 having numerical indicia thereon indicating orifice size with the name plates 40 and 42 being replaceable if desired for the name plates being orientated in 90° relation to each other. Also, the top of the cap 22 is provided with a double-headed arrow 44 to indicate the direction of movement of the stem for movement between the two positions with the arrow 38 pointing toward one of the name plates 40 or 42. Also, the cap 22 is provided with a polygonal boss 46 for enabling engagement by a wrench for removing the cap 22 for removing the plug for inspection, repair and replacement as may be deemed desirable during use.

The rotatable plug 28 has intersecting passages 47 and 48 therein. The passage 47 has an annular member 50 screwthreaded therein with the annular member having an orifice 52 of a particular diameter therein. The passage 48 has an annular member 54 therein having an orifice 56 of a different diameter therein. The housing 12 has a passage 58 extending through the boss 18 and a passage 60 extending through the boss 20 with the orifices 52 and 56 being selectively aligned with the passage 58 so that the smaller orifice 52 is in place when the arrow 38 is directed towards the name plate 42 disposed in alignment with the pipe 14.

The casing or housing 12 is provided with a drain plug 61 therein for draining the internal cavity thereof and a seal ring 62 of annular configuration is disposed peripherally of the passage 58 as illustrated in FIGURES 4 and 5 for sealing engagement with the plug 28. Also, an annular cam ring 64 is provided in encircling relation to the passage 60.

The plug 28 is provided with an eccentric configuration having two cams or high spots or lobes 66 and 68 thereon which are orientated 90° apart with the high spot or lobe 66 being opposite the passage 47 and the high spot or lobe 68 being opposite the passage 56. When the passage 47 is aligned with the passage 58, the high spot 66 engages the cam ring 64 and forces the plug body 28 into sealing engagement with the annular seal ring 62. When the plug 28 is turned 90° to register the passage or orifice 56 with the passage 58, then the high spot 68 will engage the surface of the cam ring 64 thus urging the plug fitting into sealing engagement with the seal ring 62 in the two positions of the plug 28.

The size of the intersecting passageways 47 and 48 is such that when the plug 28 is being rotated from one of its positions to the other, there is always a continuous passageway defined through the plug to communicate the passage 58 with the passage 60 in the housing 12.

The seals or O-rings 32 which retain the stem 34 sealed enables the plug to move laterally sufficient to sealingly engage the seal ring 62 when forced toward the seal ring by the cam lobes 66 or 68.

The orifices in the plug can be of various diameters and are so located as to be centered in relation to the pipe 14 when the plug 28 is properly rotatably adjusted. Additionally, the orifices in the plug are so arranged that one of the orifices is always in communication with the pipe 14 thus, the flow of gas is never completely cut-off.

The cams or high spots 66 and 68 will move the plug 28 slightly laterally to engage the seal ring 62 for a positive seal in either position of the plug thereby eliminating the use of gas pressure to seal the plug.

Also, the housing 12 is provided with a pair of cap fittings 70 and 72 on opposite sides of the orifice 52 when it is aligned with the passageway 58 and these fittings 70 and 72 also will be on opposite sides of the orifice 56 when it is aligned with the passage 58. The fittings 70 and 72 are communicated with the passage 58 on one side of the orifice and communicated with the space between the plug and the interior of the housing on the discharge side of the orifice so that a suitable gauge or other pressure measuring or recording device may be employed thus indicating the pressure on opposite sides of the orifice for enabling the differential in pressure to be gauged.

It is thought that the operation of the device will be understood in that the fitting is primarily for use in conjunction with an orifice meter for gas measurement, particularly natural gas. To reduce the pressure on the intake side of the plug or orifice, the plug 28 is rotated to bring a larger orifice into registry. Of course, when the differential pressure on the intake side of the orifice becomes too low when compared with the pressure on the discharge side of the orifice, the plug is rotated back to the opposite position to bring into registry the smaller orifice. Rotation of the plug 28 is readily accomplished manually by using a suitable wrench or the like and if desired, it may be constructed so that it will be rotated automatically from a remote point.

Also, the device may be constructed of any desired dimensions to be interposed in various sizes of pipes and the plug 28 may comprise any suitable sizes of orifices with the orifices being screwed into the plug for a positive seal and any suitable means may be provided for enabling a wrench or the like to engage the annular members which define the orifices for interchangeability thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is as follows:

1. An orifice fitting comprising a housing adapted to be interposed in a gas line and having an internal bore interposed between an inlet and an outlet, a plug body rotatably mounted in the bore of the housing and having therein two intersecting passageways, an orifice member removably secured in each passageway, said orifices being of different sizes for selective registry with the inlet and outlet, said plug extending exteriorly of the housing, said plug including exterior means for receiving a rotating tool for adjusting the position of the plug, said plug including a pair of cams provided on the outer periphery thereof and orientated in spaced relation to each other and in opposed relation to the orifices for engaging the bore of the housing in opposed relation to the inlet thereof for sealing the orifice concentrically in relation to the inlet when an orifice is in registry therewith.

2. The structure as defined in claim 1 wherein each orifice is defined by a annular member, each of said passageways having a threaded portion for removably receiving the annular member therein to enable the orifices to be interchanged with different sized orifices.

3. The structure as defined in claim 2 wherein said housing includes a pressure measuring fitting on the inlet side and outlet side of the orifices when in registry with the inlet for measuring the pressure differential through the orifice.

4. The structure as defined in claim 3 wherein said passageways and orifices are of a size and orientated in 90° relation to each other for continuous communication with the gas pipe while moving one orifice out of registry with the inlet and bringing the other orifice into registry with the inlet.

References Cited

UNITED STATES PATENTS

| 1,028,134 | 6/1912 | Raymaker | 251—301 |
| 1,813,100 | 7/1931 | Swindler. | |
| 2,151,656 | 3/1939 | Folke | 138—45 |
| 2,621,012 | 12/1952 | Graham | 138—45 |
| 2,803,426 | 8/1957 | De Zurik | 251—309 |
| 3,079,796 | 3/1963 | Freudenthal et al. | 73—211 |

FOREIGN PATENTS

| 373,651 | 5/1932 | Great Britain. |
| 628,783 | 11/1952 | Great Britain. |

RICHARD C. QUEISSER, *Primary Examiner.*

E. D. GILHOOLY, *Assistant Examiner.*